United States Patent [19]

Gonsalves et al.

[11] 4,309,602
[45] Jan. 5, 1982

[54] WAVEFRONT SENSING BY PHASE RETRIEVAL

[75] Inventors: Robert A. Gonsalves, Woburn, Mass.; Anthony J. Devaney, Ridgefield, Conn.

[73] Assignee: Eikonix Corportation, Bedford, Mass.

[21] Appl. No.: 90,420

[22] Filed: Nov. 1, 1979

[51] Int. Cl.³ .............................................. G01J 1/20
[52] U.S. Cl. .................................... 250/201; 350/359
[58] Field of Search .................. 250/201, 204, 203; 356/160 R, 160 SF

[56] References Cited
U.S. PATENT DOCUMENTS

3,979,585  9/1976  O'Meara .......................... 250/201
4,141,652  2/1979  Feinlab ............................ 250/201

Primary Examiner—David C. Nelms
Attorney, Agent, or Firm—Charles Hieken

[57] ABSTRACT

Adaptive optics with controllable delay in a matrix of regions focuses the image of an object upon a detector array in an image plane that provides a signal set representative of the radiant energy incident upon a matrix of locations in the image plane. An image signal processor processes this signal set to provide a wavefront error signal representative of the estimated wavefront phase distortion of the radiant energy incident upon the detector array. A control system responds to this wavefront error signal to effect alteration of the phase delay introduced by the adaptive optics to reduce the phase distortion of radiant energy incident upon the detector array.

2 Claims, 16 Drawing Figures

WAVEFRONT SENSING BY PHASE RETRIEVAL

BACKGROUND OF THE INVENTION

The present invention relates in general to wavefront sensing and more particularly concerns novel apparatus and techniques for providing a signal representative of estimated phase distortion at a predetermined plane of energy emitted from a remote source that may be used for reducing the phase distortion.

Wavefront sensing is useful in developing control signals for an adaptive optical system of the type generally described in U.S. Pat. No. 4,141,652 and references cited therein. For further background reference is made to the following publications:

1. J. W. Hardy, "Active Optics: A New Technology for the Control of Light", *Proc. IEEE,* vol. 66, pp. 651–697, June 1978.
2. J. W. Hardy and R. H. Hudgin, "A Comparison of Wavefront Sensing Techniques", *SPIE,* vol. 141, pp. 67–71, March 1978.
3. L. E. Schmutz, J. K. Bowker, J. Feinleib, S. Tubbs, "Integrated Imaging Irradiance ($I^3$) Sensor; A New Method for Real-Time Wavefront Measurement", *SPIE,* vol. 179, pp. 76–80, April 1979.
4. D. Kohler and L. Mandel, "Source Reconstruction from the Modulus of the Correlation Function: A Practical Approach to the Phase Problem of Optical Coherence Theory", *J. Opt. Soc. Am.,* vol. 63, pp. 126–134, 1973.
5. W. O. Saxon, *"Computer Techniques for Image Processing in Electron Microscopy",* New York, NY: Academic Press, 1978.
6. R. A. Gonsalves, "Phase Retrieval from Modulus Data", *J. Opt. Soc. Am.,* vol. 66, pp. 961–964, Sept. 1976.
7. W. H. Southwell, "Wavefront Analyzer Using a Maximum-Likelihood Algorithm", *J. Opt. Soc. Am.,* vol. 67, pp. 396–399 March 1977.
8. J. R. Fienup, "Reconstruction of an Object from the Modulus of its Fourier Transform", *Optics Letters,* vol. 3, pp. 27–29, July 1978.
9. A. Walther, "The Question of Phase Retrieval in Optics", *Opt. Acta,* vol. 10, pp. 41–49, 1963.
10. R. W. Gerchberg and W. O. Saxon, "Phase Determination from Image and Diffraction Plane Pictures", *Optic,* vol. 34, pp. 275–283, 1971.
11. A. J. Devaney, R. A. Gonsalves, and R. Chidlaw, "Application of Phase Retrieval Techniques to Adaptive Imaging Systems", (A), *J. Opt. Soc. Am.,* vol. 67, p. 1422, Oct. 1977.
12. A. J. Devaney, R. Chidlaw, R. A. Gonsalves, "Application of Phase Retrieval Techniques to Adaptive Imaging System II", (A), *J. Opt. Soc. Am.,* vol. 68, p. 1386, Oct. 1978.
13. S. L. S. Jacoby, J. S. Kawalik, and J. T. Pizzo, *"Iterative Methods for Non-Linear Optimization Problems",* Englewood Cliffs, NJ: Prentice-Hall, 1972.

Some of these publications may be referenced below by a superscript corresponding to the number above preceding the publication.

Adaptive optical systems may be used to provide improved resolution and sensitivity of astronomical telescopes, beam shaping of high energy lasers to maximize the energy on a target, phase equalization of the received signal in laser or other radiant energy communications, testing of lenses, and accurate alignment of large light-weight optical components in space.

These applications involve determination of the wavefront across an aperture of the optical system. Several proposed concepts include dither techniques, point spread inversion, phase conjugation, the use of a Hartmann sensor and the use of a shearing interferometer.

It is an important object of this invention to provide apparatus and techniques for wavefront sensing.

It is another object of the invention to achieve the preceding object through phase retrieval.

It is another object of the invention to achieve one or more of the preceding objects through measuring the modulus of an incident wavefront of radiant energy.

It is another object of the invention to achieve one or more of the preceding objects while providing a signal representative of estimated phase distortion in the wavefront of the incident radiant energy at a plane remote from the source from which the energy originates.

It is another object of the invention to achieve one or more of the preceding objects by providing a signal representative of the real nonnegative point spread function measured in the image plane.

According to the invention, there is detecting means in an image plane for providing a signal set representative of the radiant energy incident upon a matrix of locations in the image plane, and means for processing the signal set provided by said detecting means to provide a signal representative of the estimated wavefront phase distortion of the radiant energy incident upon the detecting means after passing through a predetermined plane through which the radiant energy passes before illuminating the detecting means. Preferably there is controllable means substantially in said predetermined plane for altering the phase relationships of said radiant energy when passing through said predetermined plane, and control means responsive to the estimated wavefront phase distortion signal for providing a control signal to the controllable means to effect alteration of the phase delay introduced by said controllable means at predetermined regions thereof to reduce the phase distortion of radiant energy incident upon said detecting means in said image plane.

Numerous other features, objects and advantages of the invention will become apparent from the following specification when read in connection with the accompanying drawing in which:

DETAILED DESCRIPTION OF PREFERRED EMBODIMENTS

Figure 1:
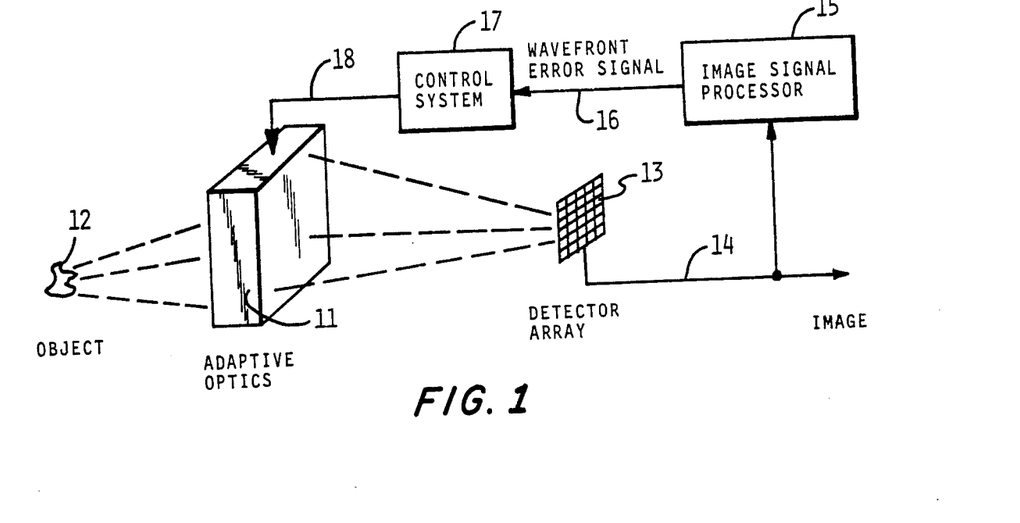
FIG. 1 is a combined block-pictorial representation of an adaptive imaging system using phase retrieval in accordance with the invention.

With reference now to the drawing and more particularly FIG. 1 thereof, there is shown a block diagram illustrating the logical arrangement of a system according to the invention. Adaptive optics 11 focus radiant energy originating from object 12 at a remote location upon detector array 13 in an image plane to provide an image signal set on line 14 representative of the radiant energy incident upon a matrix of locations on detector array 13. Image signal processor 15 processes the image signal to provide an estimated wavefront phase error signal on line 16 representative of the estimated deviation of the wavefront incident upon the image plane including detector array 13 from an undistorted wavefront, usually planar. The estimated wavefront phase error signal on line 16 is delivered to control system 17 to provide a control signal set on line 18 that controls adaptive optics 11 so that the error of the wavefront incident upon detector array 13 is reduced.

The specific forms of adaptive optics 11, control system 17 and detector array 13 are known in the art and not a part of the invention. For example, detector array 13 may be a matrix of photodiodes each of which provides a signal of magnitude related to the intensity of radiant energy incident thereon. Adaptive optics 11 may comprise a matrix of controllable reflecting surfaces which may be controlled by control system 17 to vary the delay of incident radiant energy so as to reduce the wavefront error signal. Image signal processor 15 and control system 17 coact to process the matrix of image signals on line 14 to provide a matrix of control signals on line 18 that adjusts the delay at a matrix of points in the aperture defined by adaptive optics 11 so as to reduce the wavefront error signal.

If the object 12 is a monochromatic point source, detector array 13 provides an image signal on line 14 that is the point spread function, $p(x)$, of the system. One-dimensional notation is used for simplicity. The results apply for two-dimensional images, except where noted. This real, non-negative function is the modulus squared of the system's coherent spread function, $h(x)$, $$p(x) = |h(x)|^2. \qquad (1)$$

The Fourier Transform of $h(x)$, namely $H(f)$, is the coherent transfer function of the system.

$$H(f) = \int h(x) \exp(i2\pi fx)\, dx. \qquad (2)$$

The autocorrelation function of $H(f)$ is $P(f)$, the system's optical transfer function (OTF). $P(f)$ is also the Fourier Transform of $p(x)$.

For a point source $H(f)$ has amplitude $A(f)$, a zero-one function that identifies the physical shape of the aperture. Its phase, $\theta(f)$, corresponds to the wavefront distortions caused by, say, the intervening atmosphere between object 12 and aperture at adaptive optics 11. Thus, $$H(f) = A(f)\exp(i\theta(f), \qquad (3)$$

where both $A$ and $\theta$ are real.

The invention senses the incoherent point spread function (PSF) as in (1) and processor 15 provides a signal representative of an estimate of $\theta(f)$. This estimated wavefront error signal $\hat{\theta}(f)$ may then be effectively subtracted from the actual wavefront phase error $\theta(f)$ with the adaptive optics 11 to sharpen the PSF.

Figure 2A:
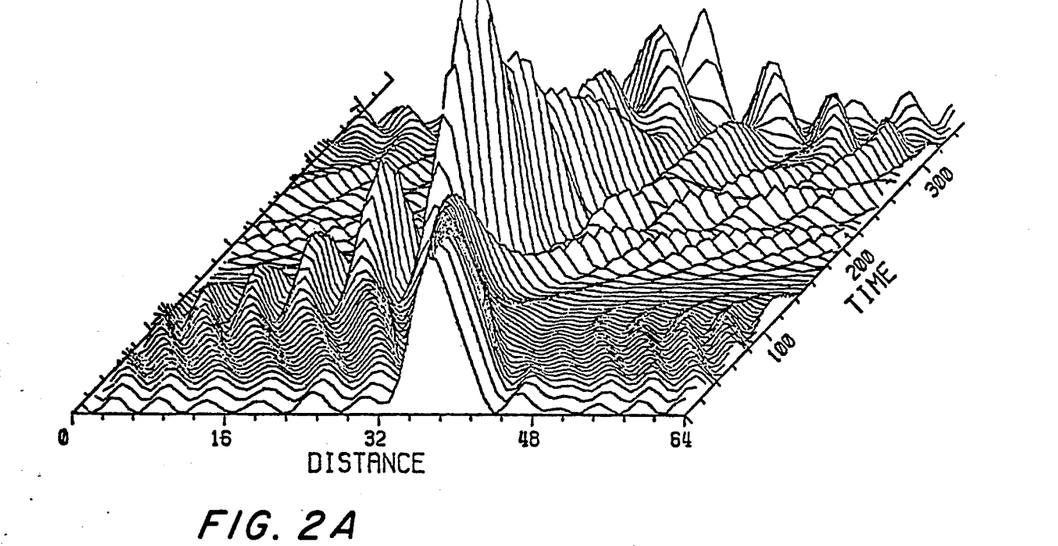
FIG. 2A is a three-dimensional representation of a time varying point spread function without correction.
Figure 2B:
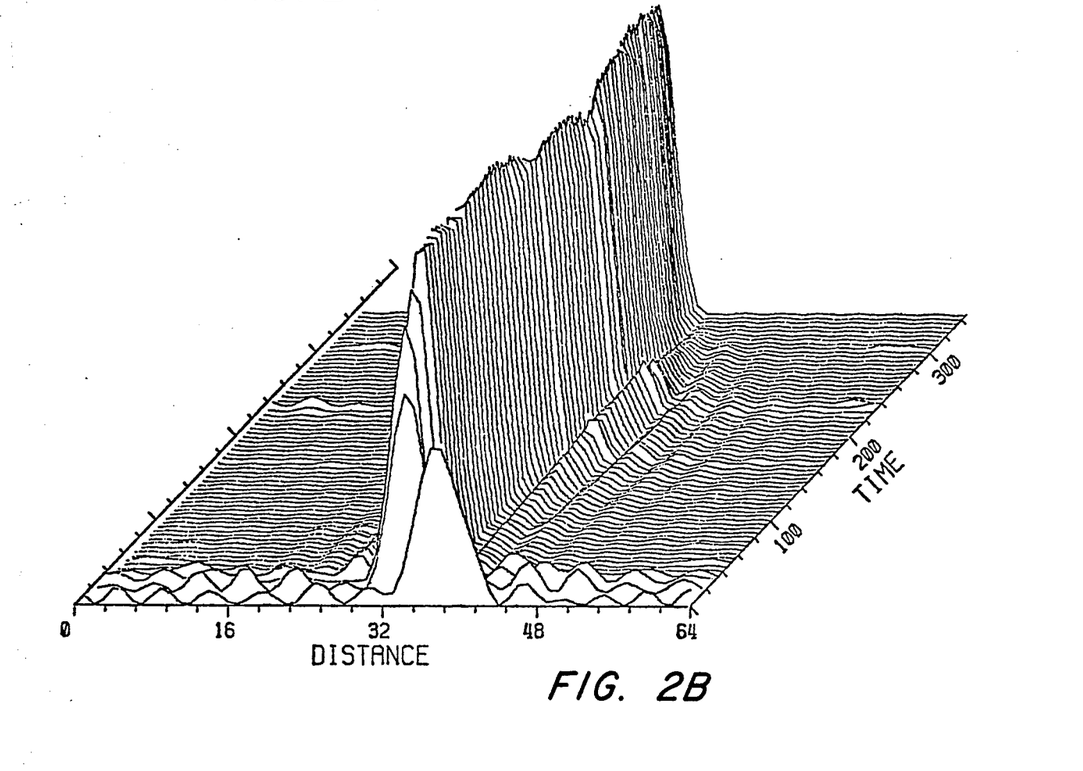
FIG. 2B is a three-dimensional representation of a time-varying point spread function with correction through an adaptive phase retrieval system.
Figure 3A:
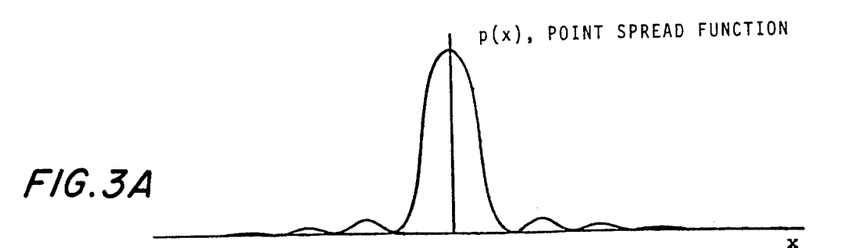
FIGS. 3A–E are graphical representations of functions helpful in illustrating phase retrieval according to the invention when an analyticity constraint is imposed.
Figure 3B:
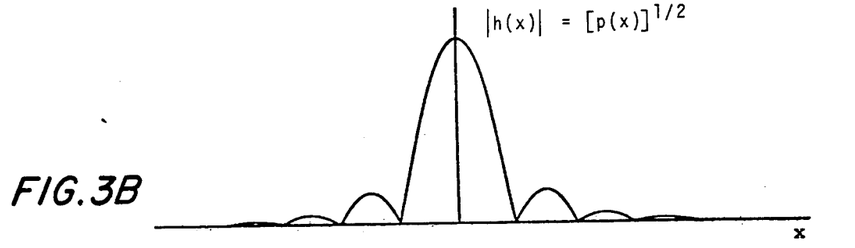
Figure 3C:
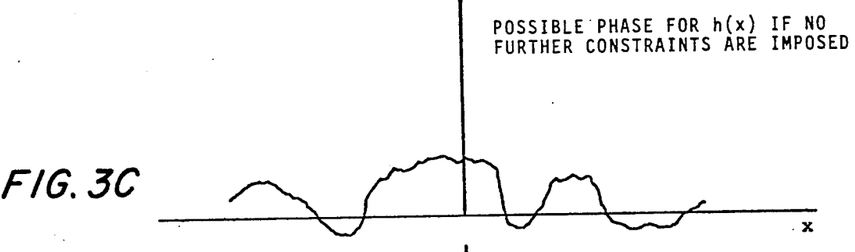
Figure 3D:
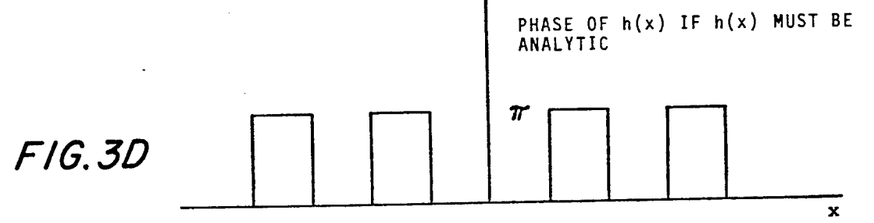
Figure 3E:
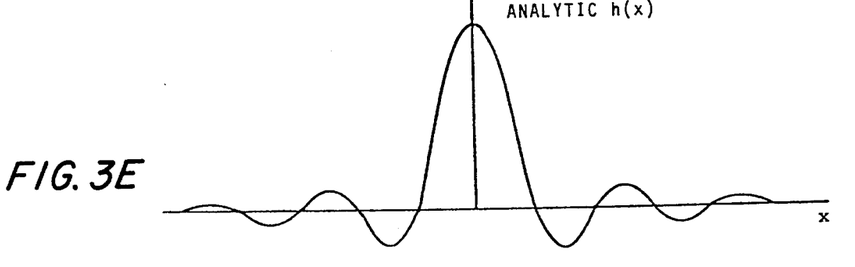

FIGS. 2A and 2B show a computer simulation of phase retrieval in active optics. FIG. 2A is a temporal profile of the one-dimensional point spread function that might be observed when a point source 12 is imaged through a turbulent atmosphere without an adaptive system 11. FIG. 2B shows the corresponding profile when at each time increment the PSF is measured, $\theta(f)$ is estimated by $\hat{\theta}(f)$, the estimate is subtracted from the actual phase at the next time increment, and the process continues. The technique provides nearly diffraction-limited performance after an initial capture interval.

Several extensions of this basic problem are possible. First, if a diode array is used for detector array 13 to record the PSF, it provides samples of $$z(x) = p(x)*d(x) + n(x), \qquad (4)$$

where "*" is the symbol for convolution, where $d(x)$ is the profile of an average diode, and where $n(x)$ is measurement noise due to diode-to-diode sensitivity variations and electronic noise. Second, if the object is not a point source, it provides $$z(x) = p(x)*d(x)*o(x) + n(x), \qquad (5)$$

where $o(x)$ is the irradiance of the extended object. Third, the image may be sensed in more than one plane. This has the effect of introducing a known quadratic phase into $\theta(f)$. And finally, the image may be sensed at more than one wavelength. For aberrations in a reflective optical system, this scales $\theta(f)$ in amplitude and scales the linear relationship between the normalized frequency variable $f$ and the spatial coordinates in the aperture.

Consider now a simple example of phase retrieval according to the invention. Referring to FIGS. 3A–3E, the PSF there shown has the form $$(\sin x/x)^2. \qquad (6)$$

Since, from (1), $h(x)$ has modulus $(p(x))^{\frac{1}{2}}$ $H(f)$ (and then $\theta(f)$ can be determined from the phase of $h(x)$. Thus the problem is observe $$|h(x)| = |\sin x/x| \qquad (7)$$

and determine $h(x)$.

This simple problem has no unique solution. Any phase can be chosen for $h(x)$ without changing (6). It is only when other constraints are imposed that $\theta(f)$ can be determined. For example, if $h(x)$ is analytic, the only solution to the problem is[9]

$$h(x) = \exp(iB)(\sin x/x), \qquad (8)$$

a smooth function $$\sin x/x$$

with the unimportant arbitrary phase term as a multiplier. Thus, if the aperture function A(f) is non-zero only over a finite segment of the f-axis, then h(x) must be analytic (Paley-Wiener theorem) and from (7), H(f) is a constant over the aperture with $\theta(f)=B$, a constant.

This, result is well known: the only phase $\theta(f)$ that gives rise to the diffraction-limited PSF $$(\sin x/x)^2 \qquad (9)$$

is a constant phase. The more result is that if all the zeros of p(x) are real and if p(x) is bandlimited, the phase $\theta(f)$ can be extracted uniquely as in (7)[9]. Note the importance of this bandlimiting requirement. For example, if A(f) has infinite extent, the Hilbert transform of the rectangular pulse will yield an h(x) with the same zero structure.

The main point to this example is that although one cannot, in general, find the phase of a complex function from its modulus, it is sometimes possible if additional information is available. In the problems solved by the invention that additional information is the modulus of the Fourier Transform of the function.

Restrict the problem to assume that A(f) is known. This may not be a severe restriction. For most imaging systems A(f) is a one-zero function, with zero corresponding to the obscurations in the aperture. The basic problem now is to observe $$|h(x)| = p^{\frac{1}{2}}(x) \qquad (10)$$

and $$|H(f)| = A(f)$$

and then deduce H(f) (or, equivalently, $\theta(f)$). By observing the modulus of a complex function in two conjugate planes, the phase of the function may be determined.

Figure 4:
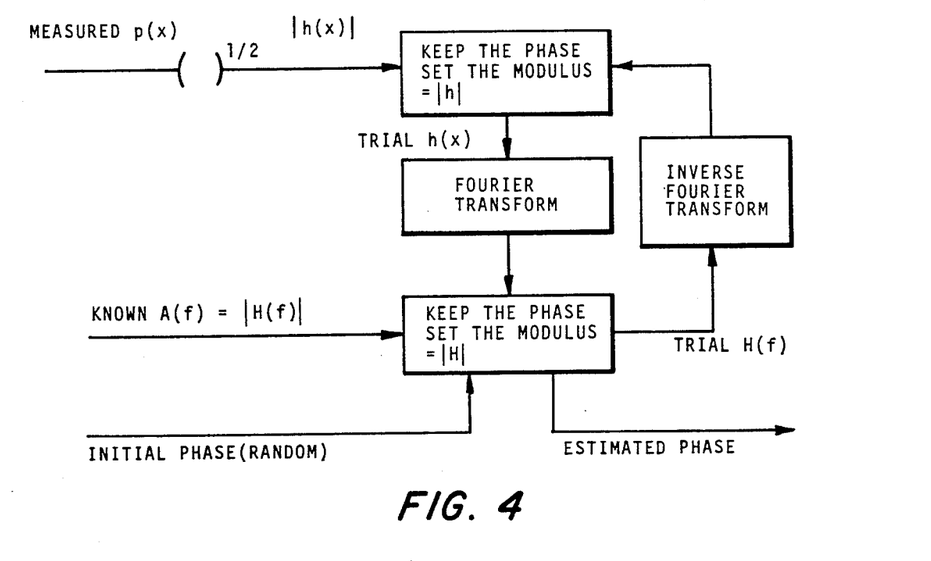
FIG. 4 is a block diagram illustrating the process of the Gerchberg-Saxton process for estimating phase.

The problem in this form was first studied by Gerchberg and Saxton[10]. Their solution is a space-frequency algorithm that is the basis for later algorithms by Saxton[5], Gonsalves[6], Devaney, et al.[11,12], and Fienup[8]. The procedure is to assume a random phase as a first, trial solution and to impose the modulus constraints implied by (8) and (9) in successive iterations. FIG. 4 illustrates this process.

Figure 5:
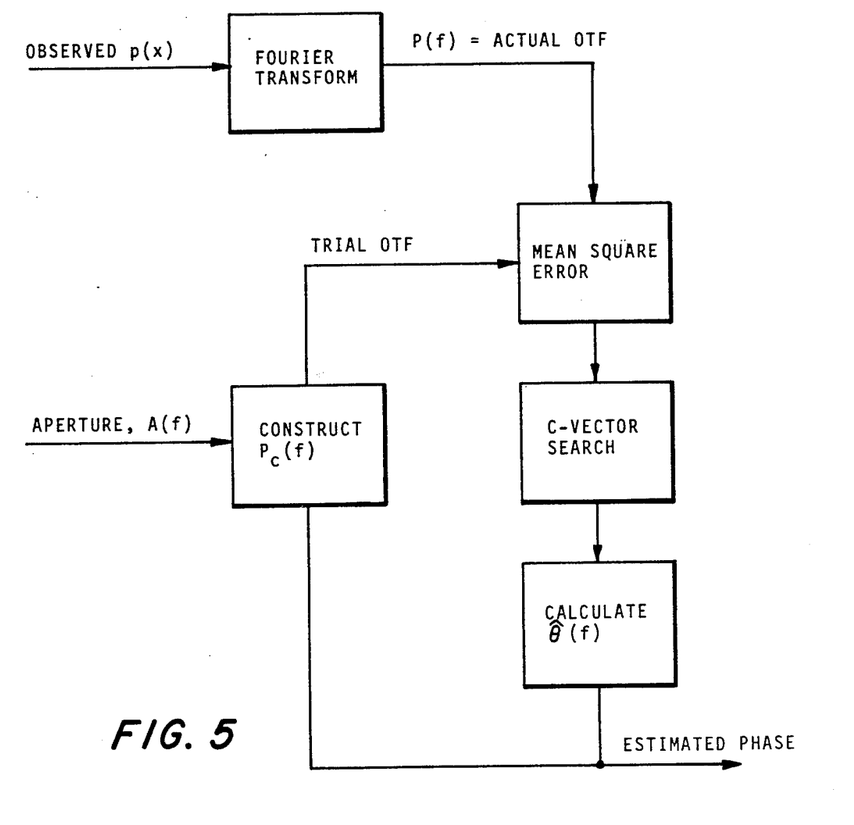
FIG. 5 is a block diagram illustrating the logical arrangement of the parameter search process for estimating phase.

A preferred technique is a parametric search process[6,11], which approximates $\theta(f)$ by a finite sum of polynomials in f and changes the coefficients in the sum until an hypothesized OTF best matches the observed OTF. Southwell[7] has shown this procedure to be optimum in a maximum-likelihood sense if the additive noise is Gaussian. The hypothesized phase is $$\hat{\theta}(f) = \sum_{k=1}^{N} c_k \phi_k(f), \qquad (11)$$

where $\phi_k(f)$ is a convenient set of f-polynomials. Typically, we use the circle Zernike polynomials for a two-dimensional aperture. From this we construct an hypothesized OTF by calculating an autocorellation function.

$$P_c(f) = \int H^*(\sigma) H(f + \sigma) d\sigma \qquad (12)$$
$$= \int A(\sigma) A(f + \sigma) \exp[i\hat{\theta}(f + \sigma) - i\hat{\theta}(\sigma)] d\sigma.$$

This is compared with the measured OTF, namely P(f), the Fourier Transform of p(x), and the mean square error is used as a metric to drive the search process.[13]

Figure 6:
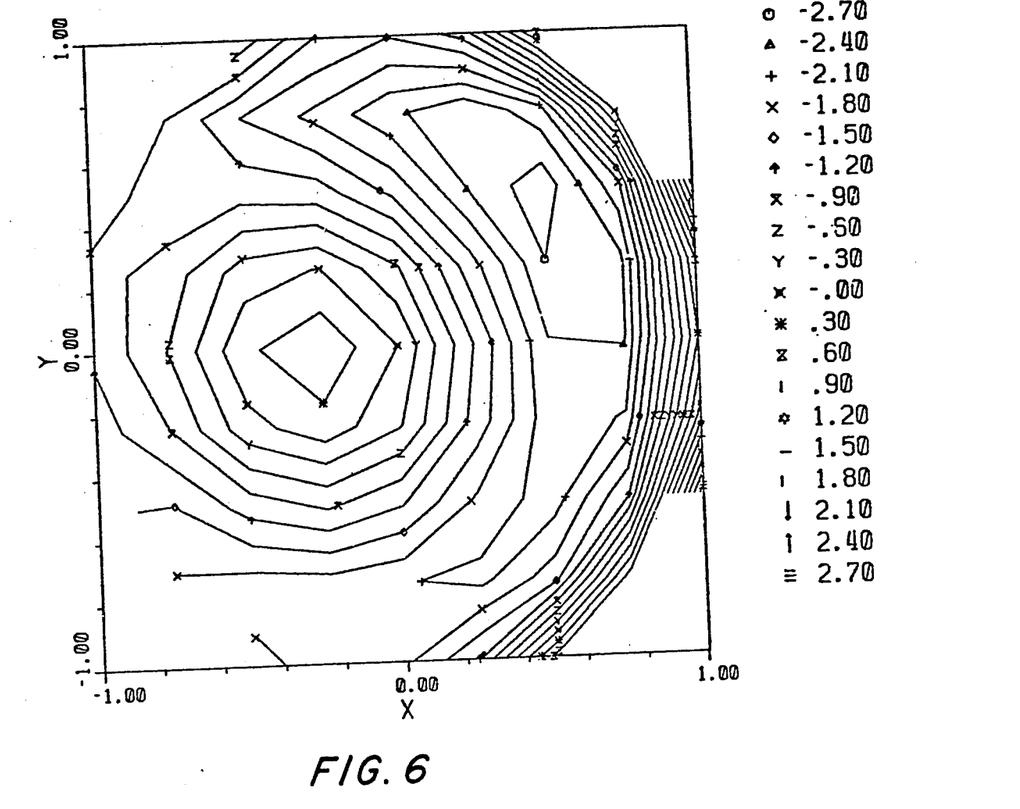
FIG. 6 is a diagrammatic representation of initial phase aberration across an exit pupil.
Figure 7:
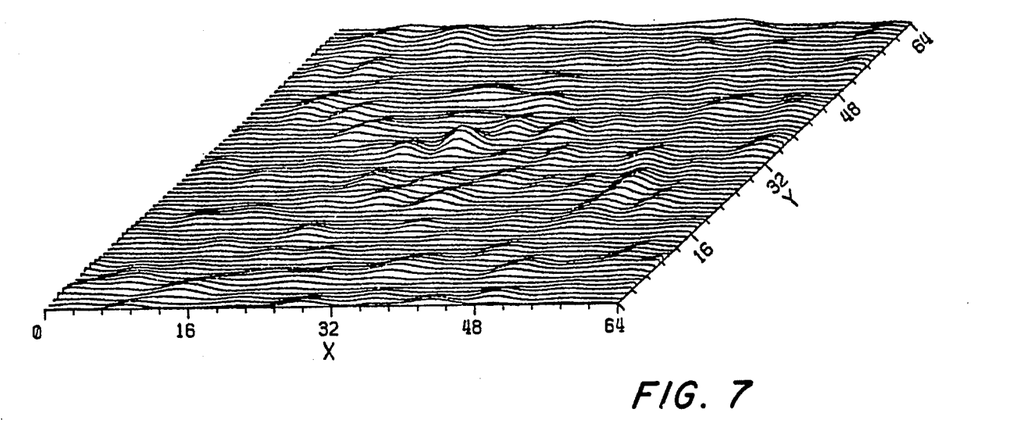
FIG. 7 is a three-dimensional representation of a point spread function of an original aberrated system.
Figure 8:
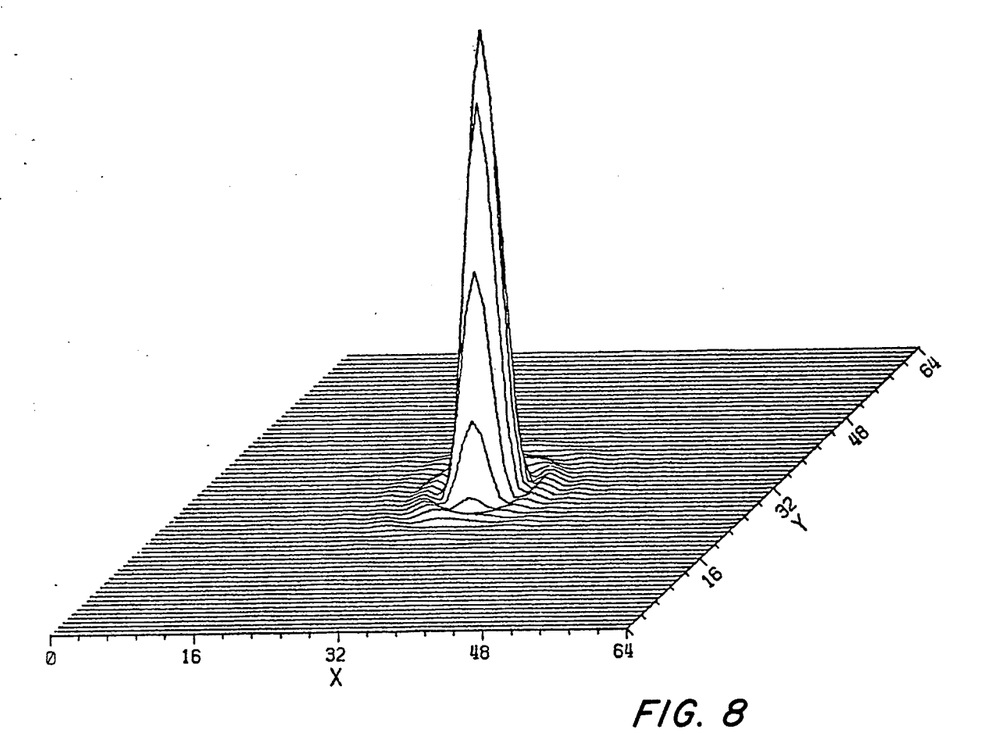
FIG. 8 is a three-dimensional representation of a point spread function after correction according to the invention.

A typical simulation of the parametric search is shown in FIGS. 6, 7 and 8. The phase across the circular, unobscurated aperture is about 2 waves peak-to-peak. This yields a PSF that is noticeable only as a ripple in FIG. 7. The process correctly finds the phase and restores the PSF to diffraction-limited as shown in FIG. 8.

This example is a highly idealized case; i.e., no noise, point source object, vanishingly small detectors in the image plane, and an adequately sampled PSF.

Figure 9:
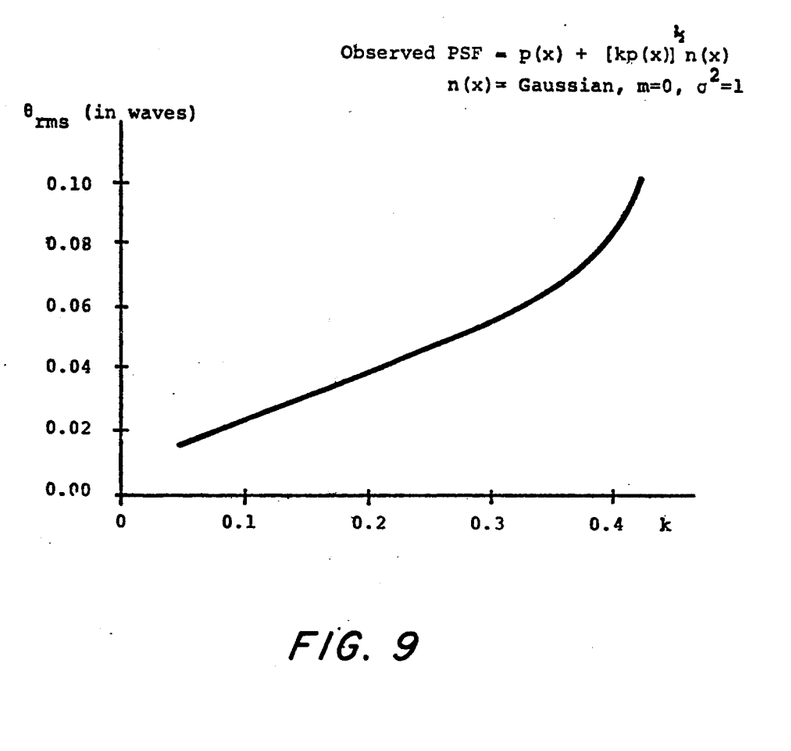
FIG. 9 is a graphical representation of phase distortion as a function of measurement noise when the input phase is 0.3 waves.

It was discovered that when p(x) is corrupted by signal-dependent noise with variance kp(x), it causes the residual phase (after correction) to increase gradually up to some value of k and then it increases rapidly. FIG. 9 shows a typical plot of the residual phase's rms value vs. input noise level when the original phase an rms value of 0.3 waves. This plot was obtained by Monte Carlo simulation. For k higher than 0.4 the residual phase increases dramatically.

Figure 10:
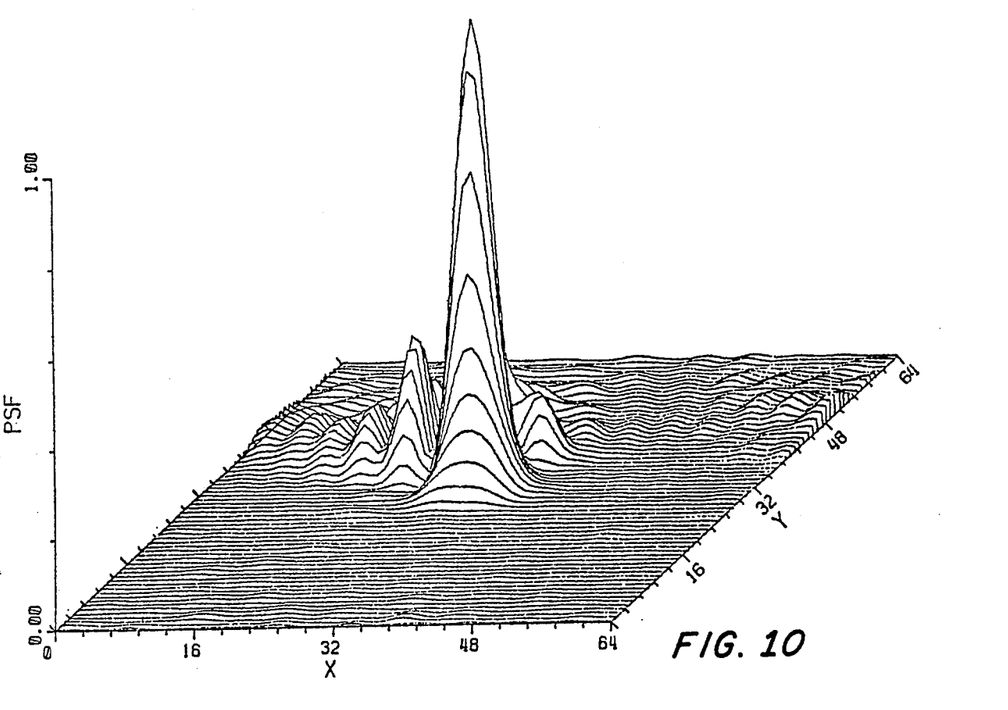
FIG. 10 shows an initial point spread function.
Figure 11:
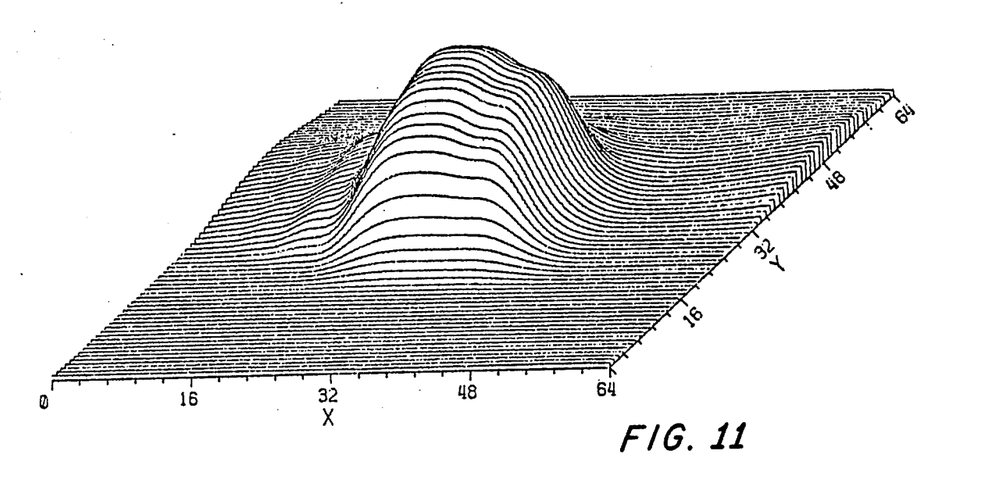
FIG. 11 shows the point spread function convolved with the detector.

The process seems to perform in the same manner for detectors at or below the size of the diffractionlimited PSF, provided the aberrated PSF is adequately sampled to avoid aliasing. Thus, consider a square detector of size $2.5\lambda F\#$ which can contain the entire central lobe of the Airy disk (the diameter is $2.44\lambda F\#$). The Nyquist sampling interval is $\lambda F\#/2$ so the (oversize) detector must be stepped in the x and y directions at an interval of 1/5 the detector size. FIGS. 10 and 11 show an example of this situation. The corrected PSF looks like FIG. 8.

If the object spectrum O(f) is known, then the problem reduces to the point-source problem. From (5) the observed signal z(x) has Fourier Transform $$Z(f) = P(f) d(f) O(f) + N(f). \qquad (13)$$

Thus, the error metric of the parametric search for $\theta(f)$ is $$E_c = \int |Z(f) - P_c(f) D(f) O(f)|^2 df. \qquad (14)$$

If the object is unknown then it must first be estimated based on additional information. Such information might be provided by sampling the image at one or more additional wavelengths or in one or more additional focal plane positions With two observations, say $z_1(x)$ and $z_2(x)$ at different focal positions, an appropriate error metric is $$E_c = \int |Z_1(f) - P_{1c}(f) D(f) O(f)|^2 df \qquad (15)$$
$$+ \int |Z_2(f) - P_{2c}(f) D(f) O(f)|^2 df.$$

For a focal plane shift, $\hat{\theta}_2(f)$ is constrained to be $\hat{\theta}_1(f)$ with an additive quadratic factor in f; then $P_{1c}$ and $P_{2c}(f)$ are calculated as in (12). This $E_c$ is minimized by choice of O(f) when $$D(f) \hat{O}(f) = \frac{P_{1c}^* Z_1 + P_{2c}^* Z_2}{|P_{1c}|^2 + |P_{2c}|^2}. \qquad (16)$$

When this is substituted into (15) the result is $$E_c = \int \frac{|Z_1 P_{2c} - Z_2 P_{1c}|^2}{|P_{1c}|^2 + |P_{2c}|^2} df. \qquad (17)$$

Limited successful testing of this result (Gaussian object, detector size $<2.5\lambda F\#$, adequate spatial sampling, several focal planes and several wavelengths, small noise, $\theta$rms 0.3 waves) has been performed.

There has been described novel apparatus and techniques for providing an estimated wavefront error signal by digital processing of the focal plane image provided by a detector array. The image processing means may comprise a microprocessor or other suitable digital processor. A type PDP-11/70 digital computer was used as an image processor in an actual embodiment of the invention that produced an estimated wavefront error signal in response to an image incident upon a Reticon array of diodes illuminated by a 6328 A. laser. It is evident that those skilled in the art may now make numerous uses and modifications of and departures from the specific apparatus and techniques disclosed herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. Phase retrieval wavefront sensing apparatus comprising,
    detecting means in an image plane for providing a signal set representative of the radiant energy incident upon a matrix of locations in said image plane,
    and means for processing the signal set provided by said detecting means to provide an estimated error signal representative of the estimated wavefront phase distortion of the radiant energy incident upon the detecting means after passing through a predetermined plane having a region through which the radiant energy passes before illuminating the detecting means,
    substantially all the radiant energy passing through said region illuminating said detecting means.

2. Phase retrieval wavefront sensing apparatus in accordance with claim 1 and further comprising,
    controllable means substantially filling said region in said predetermined plane for altering the phase relationships of said radiant energy when passing through said predetermined plane,
    and control means responsive to said estimated error signal for providing a control signal to said controllable means to effect alteration of said phase relationships to reduce the phase distortion of radiant energy incident upon said detecting means in said image plane.

* * * * *